United States Patent
Jost et al.

(10) Patent No.: US 11,495,841 B2
(45) Date of Patent: Nov. 8, 2022

(54) METHOD FOR DETECTING A WATER INGRESS INTO A HOUSING, ELECTRONIC CIRCUIT FOR CARRYING OUT THE METHOD, HOUSING INCLUDING THE ELECTRONIC CIRCUIT AND VEHICLE INCLUDING THE HOUSING

(71) Applicant: Robert Bosch GmbH, Stuttgart (DE)

(72) Inventors: Thomas Jost, Metzingen (DE); Walter Gronbach, Kohlberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/680,614

(22) Filed: Nov. 12, 2019

(65) Prior Publication Data

US 2020/0149989 A1    May 14, 2020

(30) Foreign Application Priority Data

Nov. 13, 2018  (DE) .......................... 102018219370.3

(51) Int. Cl.
| | |
|---|---|
| *B62J 45/41* | (2020.01) |
| *G01M 3/32* | (2006.01) |
| *G08B 21/20* | (2006.01) |
| *H01M 10/48* | (2006.01) |
| *G01M 3/18* | (2006.01) |

(52) U.S. Cl.
CPC ............ *H01M 10/48* (2013.01); *B62J 45/41* (2020.02); *G01M 3/183* (2013.01); *G01M 3/186* (2013.01); *G01M 3/3236* (2013.01); *G08B 21/20* (2013.01)

(58) Field of Classification Search
CPC ...... A61M 16/16; G01M 3/183; G01M 3/186; G01M 3/3236; G01N 33/0062; G08B 21/20; H01M 2/1077; H01M 10/48; H02K 9/193; H04Q 9/00; H05K 5/0213
USPC ........................................................ 340/605
See application file for complete search history.

(56) References Cited

U.S. PATENT DOCUMENTS

| | | | | |
|---|---|---|---|---|
| 4,276,768 | A  * | 7/1981 | Dadachanji | G01N 25/68 |
| | | | | 374/28 |
| 5,798,702 | A  * | 8/1998 | Okamoto | B62M 6/45 |
| | | | | 340/636.1 |
| 7,035,736 | B2 * | 4/2006 | Nissila | G01W 1/17 |
| | | | | 702/3 |
| 10,739,292 | B1 * | 8/2020 | Melcher | B32B 17/10036 |
| 2003/0105567 | A1 * | 6/2003 | Koenig | H01M 10/48 |
| | | | | 701/36 |
| 2004/0263351 | A1 * | 12/2004 | Joy | G01D 21/02 |
| | | | | 340/870.01 |

(Continued)

FOREIGN PATENT DOCUMENTS

| | | | | |
|---|---|---|---|---|
| DE | 3621309 A1 * | 1/1988 | ............ | G01M 3/002 |
| DE | 10249370 A1 | 5/2004 | | |

(Continued)

*Primary Examiner* — Stephen R Burgdorf
(74) *Attorney, Agent, or Firm* — Norton Rose Fulbright US LLP; Gerard Messina

(57) ABSTRACT

A method for detecting a water ingress into an interior of a housing, which is sealed against the surroundings, including the following steps: detecting a temperature of the air in the interior; detecting a relative air humidity in the interior; and detecting a water ingress as a function of the detected temperature and of the detected relative air humidity.

10 Claims, 5 Drawing Sheets

(56) References Cited

U.S. PATENT DOCUMENTS

| | | | |
|---|---|---|---|
| 2005/0092067 A1* | 5/2005 | Petrovic | G01N 21/3504 250/338.5 |
| 2008/0065290 A1* | 3/2008 | Breed | G01L 17/00 701/31.4 |
| 2008/0310112 A1* | 12/2008 | Long | H05K 5/0213 361/701 |
| 2011/0060547 A1 | 3/2011 | Foucher et al. | |
| 2011/0127945 A1* | 6/2011 | Yoneda | H02J 7/0031 320/101 |
| 2014/0191873 A1* | 7/2014 | Kreiner | H04B 17/23 340/604 |
| 2015/0286994 A1* | 10/2015 | Elder | G06Q 10/20 705/305 |
| 2015/0338315 A1* | 11/2015 | Manahan | G01M 99/008 702/183 |
| 2016/0184759 A1* | 6/2016 | Gencer | C23F 11/02 96/111 |
| 2017/0003229 A1 | 1/2017 | Yunker et al. | |
| 2017/0163005 A1* | 6/2017 | Takigawa | H01S 3/042 |
| 2017/0219144 A1* | 8/2017 | Petrou | F16L 27/087 |
| 2018/0048032 A1* | 2/2018 | Takatsuka | B60L 58/24 |
| 2018/0186241 A1* | 7/2018 | Harvey | B60L 58/15 |
| 2018/0367059 A1* | 12/2018 | Tsukano | F24F 1/24 |
| 2019/0072450 A1* | 3/2019 | Nakashima | G01M 3/002 |
| 2019/0299152 A1* | 10/2019 | Alexander | F16K 11/052 |
| 2021/0088197 A1* | 3/2021 | Koulouh | B60Q 1/04 |

FOREIGN PATENT DOCUMENTS

| | | | | |
|---|---|---|---|---|
| DE | 102012023073 A1 | | 5/2013 | |
| DE | 102013212593 A1 | * | 12/2014 | ............ H01M 10/48 |
| DE | 102013212593 A1 | | 12/2014 | |
| DE | 102014223359 A1 | | 5/2016 | |
| DE | 102016125905 A1 | | 7/2017 | |
| DE | 112015005811 T5 | | 9/2017 | |
| JP | 03177724 A | * | 8/1991 | ............. F24F 3/044 |
| JP | 2002267238 A | * | 9/2002 | ............... G01K 3/04 |
| JP | 2012132872 A | * | 7/2012 | ............. G01M 3/04 |
| JP | 2015230742 A | * | 12/2015 | ............ H01M 10/48 |

* cited by examiner

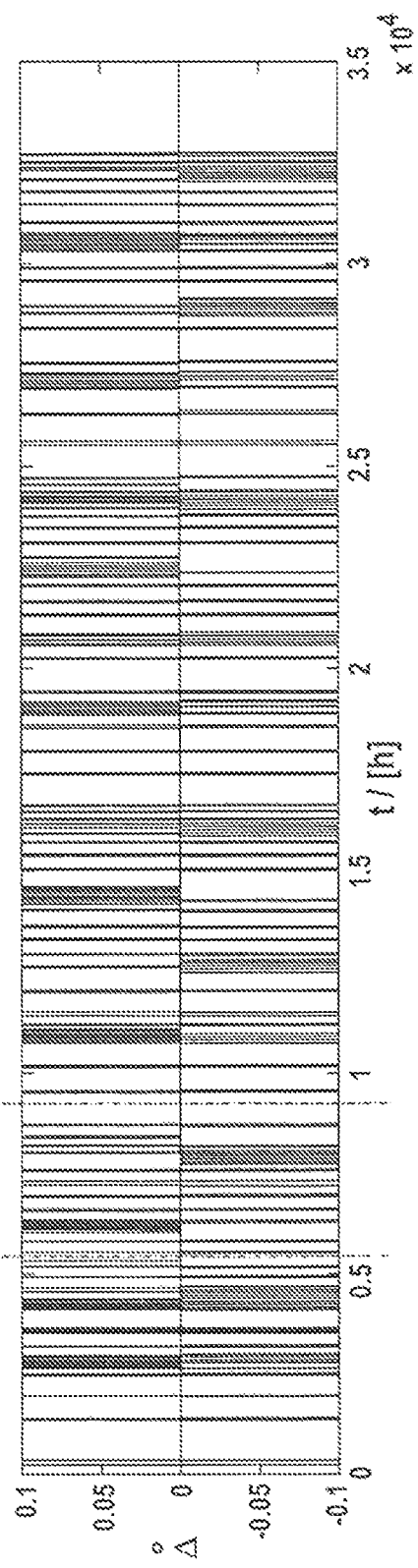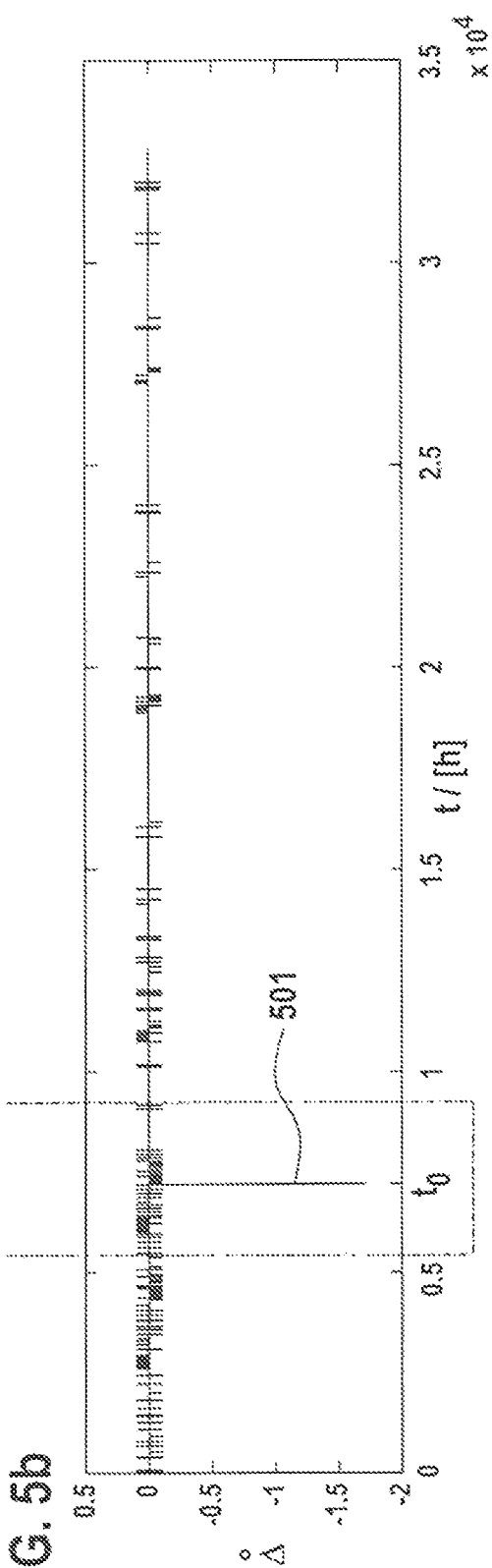

METHOD FOR DETECTING A WATER INGRESS INTO A HOUSING, ELECTRONIC CIRCUIT FOR CARRYING OUT THE METHOD, HOUSING INCLUDING THE ELECTRONIC CIRCUIT AND VEHICLE INCLUDING THE HOUSING

CROSS REFERENCE

The present application claims the benefit under 35 U.S.C. § 119 of German Patent Application No. DE 102018219370.3 filed on Nov. 13, 2018, which is expressly incorporated herein by reference in its entirety.

FIELD

The present invention relates to a method for detecting water ingress into a housing as a function of a detected temperature and a detected relative humidity. The present invention also relates to an electronic circuit for carrying out the method as well as a housing including the electronic circuit and a vehicle including the housing, in particular an electric bicycle.

BACKGROUND INFORMATION

An absolute air humidity $\rho$ is water vapor mass $m_w$ which is contained in an air volume V according to equation (1) and is usually indicated in unit $g/m^3$. According to the ideal gas equation, air humidity $\rho$ may be alternatively described as the ratio of the partial pressure of water vapor $e_w$ to the product from individual gas constant of water $R_w$ and absolute temperature T.

$$\rho = \frac{m_x}{v} = \frac{e_w}{R_w \cdot T} \quad (1)$$

A relative air humidity $\varphi$ is a ratio of absolute air humidity $\rho$ to maximally possible mass of water vapor $\rho_{max}$ in the air or the ratio of the partial pressure of water vapor $e_w$ to its saturation vapor pressure $e_{sat}$ according to equation (2). Relative air humidity $\varphi$ may be detected or measured with the aid of a humidity sensor, for example by absorbing water within a porous polymer matrix, thus changing a dielectric constant. Saturation vapor pressure $e_{sat}$ is temperature-sensitive and may be determined, for example, with the aid of Magnus' formula, see equation (3), C1, C2, and C3 being temperature-sensitive constants.

$$\varphi = \frac{\rho}{\rho_{max}} = \frac{e_w}{e_{sat}} \quad (2)$$

$$e_{sat} = C1 \cdot \exp\left[\frac{C2 \cdot T}{C3 + T}\right] \quad (3)$$

The dew point refers to a temperature of a saturated gas mixture in an equilibrium, i.e., in which condensation and evaporation of the moisture component even out. At temperatures T lower than dew point $\tau$, condensation is formed. Dew point $\tau$ is a function of the partial pressure of water vapor $e_w$ according to equation (4), C1, C2, and C3 being the temperature-sensitive constants.

$$r(e_W) = \frac{C3 \cdot \ln\frac{e_W}{C1}}{C2 - \ln\frac{e_W}{C1}} \quad (4)$$

Housings for electronic components, in particular electronic circuits and batteries, are usually tightly closed or sealed against water ingress from the surroundings of the housing with the aid of polymer seals. The air enclosed in an interior of a housing for electronic components is typically dry or has a low absolute air humidity and typically a temperature between −30° C. and 80° C., in particular between −20° C. and 50° C. In other words, the enclosed air usually has an unsaturated state, which is why water is essentially present as water vapor in the interior of the housing throughout the entire temperature range of an application, plastic portions of the housing additionally also being able to absorb or bind and/or desorb water, for example. Consequently, dew point $\tau$ of the atmosphere is usually low in an interior of a housing of an electrical circuit, whereby a condensation, which is harmful for the electronic components, is prevented from forming.

However, a water ingress into the interior of the housing may take place, for example, as a result of misuse during cleaning, in particular as a result of an application of high-pressure cleansers in the area of the seals due to mechanical damage and/or material fatigue.

An electrical circuit for controlling an electric motor of an electric bicycle is, for example, situated in a housing of a drive unit at the crankshaft of the electric bicycle, the housing advantageously additionally including the electric motor. The installation of the electric motor or of the housing in the area of the crankshaft has some technical advantages, for example with regard to a weight distribution and/or the gravity center of the electric bicycle or with regard to the riding experience for the cyclist. However, a water ingress into the housing of the drive unit as a result of spray water during the ride and/or as a result of mechanical damage of the housing through falling rocks, ground contact or the like is more likely in this installation position at the crankshaft than when installing the drive motor at a wheel hub. Furthermore, material fatigue may be accelerated if an electric bicycle is parked at an unfavorable parking spot. The tightness requirements for a drive unit of an electric bicycle, for example, are consequently very high, medium- and long-term damage of the drive unit being avoided by a repair after a rapid detection of a water ingress.

German Patent Application No. DE 102 49 370 A1 describes a housing of a control unit including a humidity sensor for detecting an ingress of moisture.

German Patent Application No. DE 10 2012 023 073 A1 describes a servo-assisted steering mechanism including a humidity sensor.

An object of the present invention is to improve a detection of a water ingress into a housing.

SUMMARY

The above-mentioned object may achieved in accordance with example embodiments of the present invention.

The present invention relates to a method for detecting a water ingress into an interior of a housing that is sealed with regard to its surroundings. The sealed housing advantageously includes in the interior at least one electrical circuit, in particular for steering a vehicle, the vehicle advantageously being an electric bicycle, and/or a current source, in particular for the purpose of providing an energy for driving the vehicle or electric bicycle. The sealed housing furthermore preferably includes an electrical interface between the interior and an outer side of the housing. The method according to the present invention includes a detection of a temperature in the interior of the housing. The temperature detection preferably takes place with the aid of a temperature sensor, which is situated in the interior. In another step, a relative air humidity is detected in the interior of the housing. The detection of the relative air humidity preferably takes place with the aid of a humidity sensor, which is also situated in the interior. Furthermore, a detection of a water ingress into the housing is subsequently carried out as a function of the detected temperature and of the detected relative air humidity. The method yields the advantage that an absolute humidity and/or a dew point of the air in the interior is/are ascertained, the water ingress being detected, for example, upon exceedance of a threshold value. A change over time in the absolute and/or relative humidity and/or in the dew point of the air in the interior or in the equilibrium between condensation and evaporation of the air in the interior is advantageously ascertained and compared to a static or advantageously dynamic threshold value, whereby a rapid detection of the water ingress takes place. With the aid of this method, an ingress of very small water quantities may also be advantageously detected, since the shift in equilibrium between condensation and evaporation of the air also takes place in the case of small quantities in the interior of a housing. With the aid of this method, the detection of a water ingress is advantageously made possible with the aid of two sensors, i.e., the temperature sensor and the humidity sensor, the two sensors being situated in the interior of the housing in a manner protected against chemical and/or mechanical effects, for example.

In one preferred refinement of the present invention, the ascertainment of the water ingress is carried out as a function of a difference between the detected temperature and a dew point ascertained as a function of the detected relative air humidity and of the detected temperature. In the case of an ingress of water, the equilibrium between condensation and evaporation advantageously changes for the ascertainment of the water ingress, whereby the dew point increases, in particular. This difference between the detected temperature and a dew point ascertained as a function of the detected temperature and the detected relative air humidity represents an instantaneous temperature gap up to the formation of a condensate. The difference or this temperature gap has advantageously empirically proven as a reliable quality criterion for detecting the water ingress.

In one particularly preferred embodiment of the present invention, the detection of the water ingress takes place as a function of a change rate of the difference between the detected temperature and the ascertained dew point. Taking into account the change rate of the difference has advantageously empirically proven to be a rapid and very reliable quality criterion for detecting the water ingress.

In one refinement of the present invention, the detection of the water ingress takes place, when the difference and/or the change rate of the difference exceed(s) a static or dynamic threshold value in each case. The threshold value is preferably dynamic. This refinement results in the water ingress being detected particularly rapidly and particularly reliably.

In one embodiment of an example method in accordance with the present invention, water ingress information is displayed to a user as a function of the detection of the water ingress, in particular with the aid of a display of an electric bicycle. With the aid of this embodiment, a user is advantageously informed about a detected water ingress.

In one advantageous example embodiment of the method according to the present invention, an adaptation of an electrical charging or discharge current of a current source takes place as a further step in the method as a function of the detected water ingress, the current source being situated in the interior of the housing. The current source is in particular a battery, preferably a battery of an electric bicycle. This adaptation may advantageously represent a switching off of the current flow. By adapting the charging or discharge current, damage to the battery and/or other electrical components and in particular a short circuit are advantageously avoided.

In another example embodiment in accordance with the present invention, following a detection of the water ingress, an error code is stored in an electronic memory as a function of the detected water ingress. In this way, an ascertained water ingress is advantageously detected during maintenance at a later point in time, whereby same may be taken into account as the error cause for repair purposes, for example.

Furthermore, a change in a service interval advantageously takes place as a function of the detected water ingress, the service interval being advantageously displayed to the driver of a vehicle having the housing, in particular to the rider of an electric bicycle. In this way, the user or the rider of the electric bicycle is advantageously prompted to have the housing repaired by an expert professional.

In another refinement in accordance with the present invention, a service appointment is automatically established as a function of the detected water ingress with the aid of a radio contact to a database of a server device and displayed or proposed on a display device to a user of the housing or a driver, the user being advantageously able to decline, confirm, or postpone this service appointment through an input with the aid of an input device. User data and the input data are transmitted to the database of the server device with the aid of the radio contact, the server device preferably transmitting the service appointment to a repair shop. In this way, there is advantageously an immediate response to a water ingress, so that medium-term and long-term damage due to the water ingress is avoided.

In another refinement of the example method according to the present invention, a drying agent is released as a function of the detected water ingress in the interior of the housing, for example a silica gel and/or a zeolite is/are released. The drying agent is advantageously used to at least reduce the possible damaging effect of the water ingress. This release may take place, for example, by opening a closing device, for example a mechanically pretensioned flap and/or a fused membrane opening in the case of a current flow.

The present invention also relates to an electronic circuit for carrying out the method for detecting the water ingress.

The present invention further relates to a housing including this electronic circuit, the housing being in particular a housing of a display of a battery or of a drive unit of a vehicle.

The present invention moreover relates to a vehicle including at least this housing, the vehicle being an electric bicycle in particular.

Further advantages result from the description below of exemplary embodiments with reference to the figures.

BRIEF DESCRIPTION OF THE DRAWINGS

FIG. 5a shows a diagram for the profile of the change rate without a water ingress.

FIG. 5b shows a diagram for the profile of the change rate in the case of a water ingress.

DETAILED DESCRIPTION OF EXAMPLE EMBODIMENTS

Figure 1:
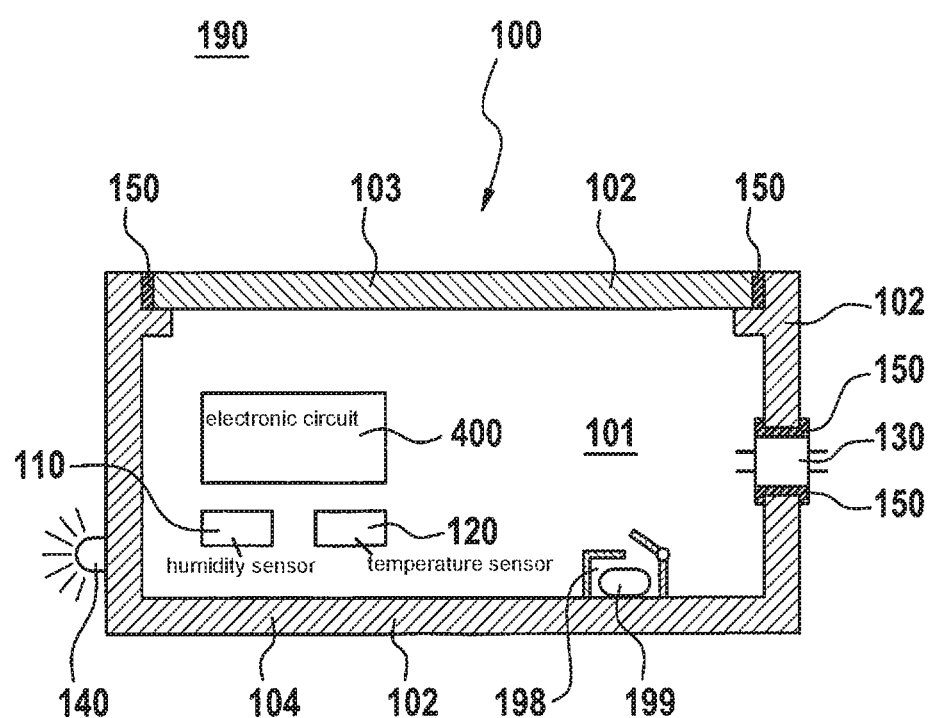
FIG. 1 shows a housing.

In FIG. 1, a housing 100 is illustrated, for example of a drive unit 230 of an electric bicycle. Housing 100 includes an interior 101, a humidity sensor 110, and a temperature sensor 120. Housing 100 further includes an electronic circuit 400 for carrying out a method according to the present invention. Electronic circuit 400 may be advantageously additionally configured to activate an electric motor of an electric bicycle for the purpose of driving the electric bicycle. Furthermore, electrical interfaces 130 are illustrated at an outer wall 102 of housing 100. Moreover, housing 100 includes display means 140, for example LED elements. Housing 100 is sealed with the aid of at least one polymer seal 150 against a water ingress from surroundings 190. Housing 100 includes, for example, a cover 103 and a basic unit 104, polymer seals 150 being situated, for example, between cover 103 and basic unit 104 as well as at electrical interfaces 130. Housing 100 may be subject to damage or leakages due to an impact load or long-term material fatigue, for example of polymer seals 150, thus resulting in short-term or long-term water ingress. Furthermore, an additionally closed space 198 including a drying agent 199 is optionally provided in housing 100, space 198 being opened in the case of detected water ingress and drying agent 199 being released. Optionally and preferably, housing 100 includes a pressure balance element (not illustrated in FIG. 1) that balances the atmospheric pressure between interior 101 of the housing and surroundings 190. The optional pressure balance element may be advantageously used to improve a sealing effect of polymer seals 150.

Figure 2:
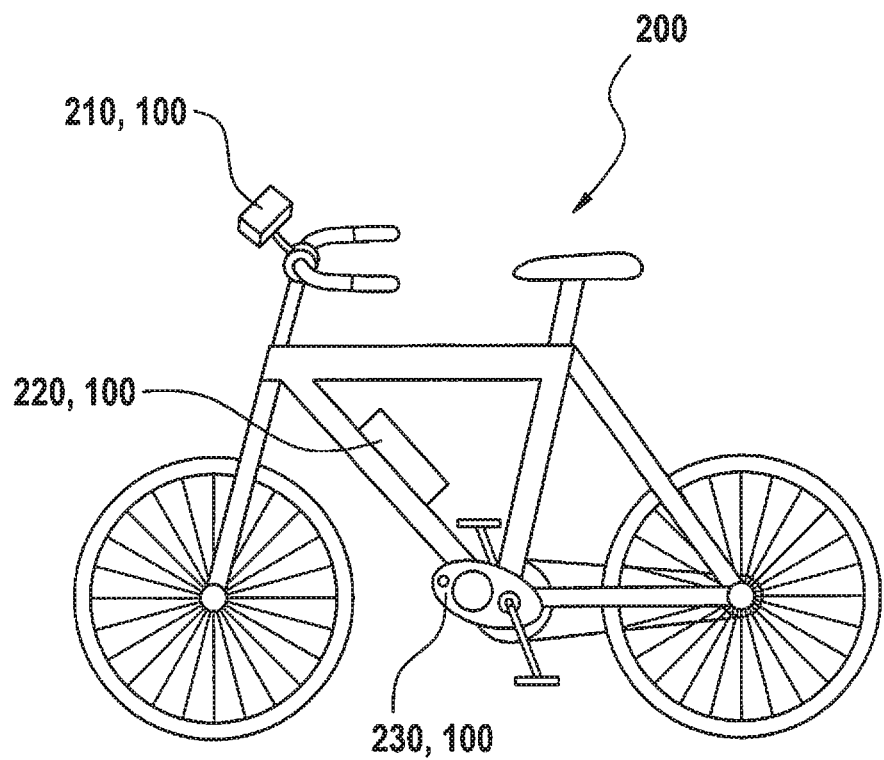
FIG. 2 shows an electric bicycle including the housing.

In FIG. 2, an electric bicycle 200 is illustrated including a battery 220, a display 210, and a drive unit 230, which may include an electronic circuit or a control unit, for example. Battery 220 and/or display 210 and/or drive unit 230 have a housing 100 according to the present invention.

Housing 100 may be for example alternatively used in other technical applications, for example housing 100 may include a safety-relevant electrical circuit of a vehicle. For example, the housing is a housing of a power electronic device of an electric vehicle, a housing 100 of a control unit of a steering system of a vehicle, a housing 100 of a battery or of a battery management system of a vehicle, or a housing of a power tool.

Figure 3:
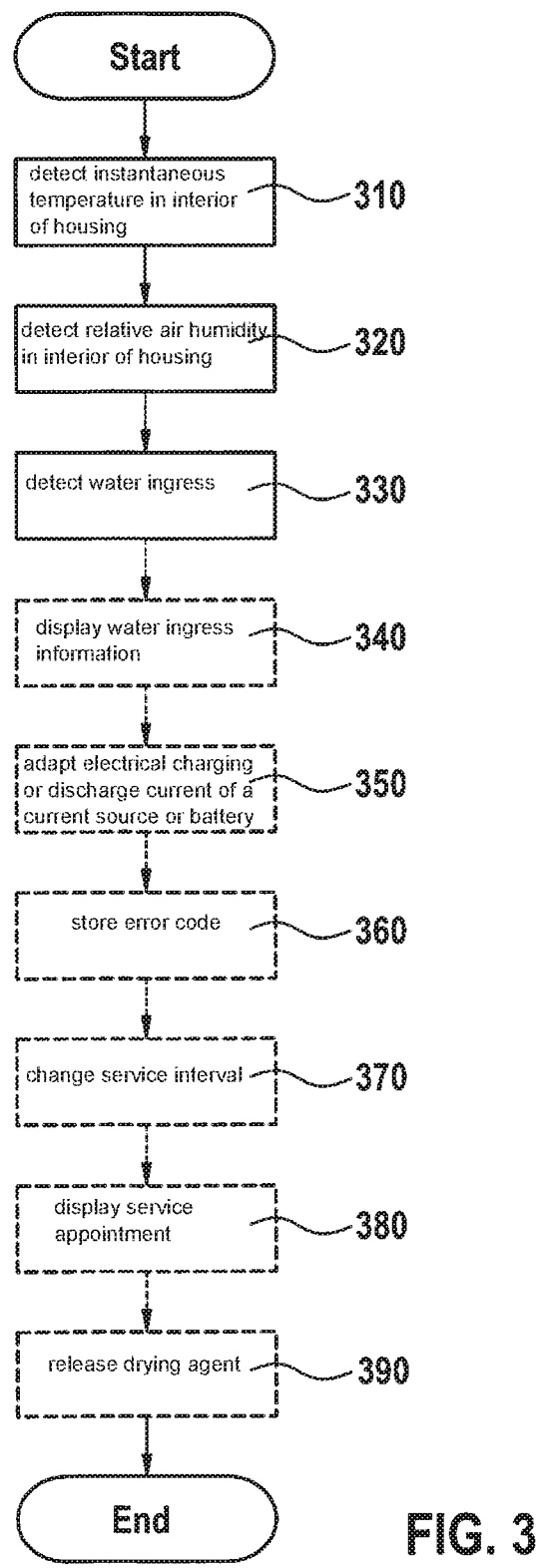
FIG. 3 shows a flow chart of the method for detecting the water ingress.

In FIG. 3, a flow chart of the method for detecting 330 a water ingress into housing 100 is illustrated. The method has a step 310, in which an instantaneous temperature in interior 101 of housing 100 is detected. In step 320, a relative air humidity of the air is detected in interior 101 of housing 100. Subsequently, a detection of the water ingress takes place in step 330 as a function of the detected temperature and of the detected relative air humidity. Detection 330 of the water ingress takes place in particular as a function of an ascertained difference $\Delta$ between detected temperature T and a dew point $\tau$ ascertained as a function of detected relative air humidity $\varphi$ and as a function of detected temperature T. The detection of the water ingress takes place, for example, when this ascertained difference $\Delta$ falls below or exceeds a threshold value. Alternatively and preferably, detection 330 of the water ingress takes place as a function of a chronological change rate $\dot{\Delta}$ of ascertained difference $\Delta$ in particular when chronological change rate $\dot{\Delta}$ of difference $\Delta$ exceeds a static or dynamic threshold value S. Threshold value S is preferably dynamic. Threshold value S is advantageously ascertained as a function of one or multiple static performance figure(s) of chronological change rate $\dot{\Delta}$ of difference $\Delta$, for example of a mean value and/or of a standard deviation and/or of a multiple of the standard deviation. When ascertaining the dynamic threshold value, the statistical characteristics of chronological change rate $\dot{\Delta}$ of difference $\Delta$ are advantageously ascertained within a time period prior to the instantaneous point $\tau$ n time or glidingly. In a step 340, water ingress information is optionally displayed to a user, for example with the aid of display means 140, as a function of detection 330 of the water ingress. Moreover, an optional adaptation 350 of an electrical charging or discharge current of a current source or battery, which is situated in the interior of housing 100, may be carried out as a function of the detected water ingress. Adaptation 350 of an electrical charging or discharge current may take place until the current source is switched off with the aid of an electrical switch. An optional storage 360 of an error code in an electronic memory may be further carried out as a function of the detected water ingress, the electronic memory being advantageously also situated in housing 100 and read out with the aid of interface 130, for example. A change 370 of a service interval of a vehicle further optionally takes place as a function of the water ingress detected in step 330. In one optional refinement, a service appointment is established and in particular displayed to the user in optional step 380 as a function of the detected water ingress with the aid of a radio contact to a server device. Furthermore, a release 390 of a drying agent 199 in interior 101 of housing 100 may be optionally provided as a function of the detected water ingress.

Figure 4A:
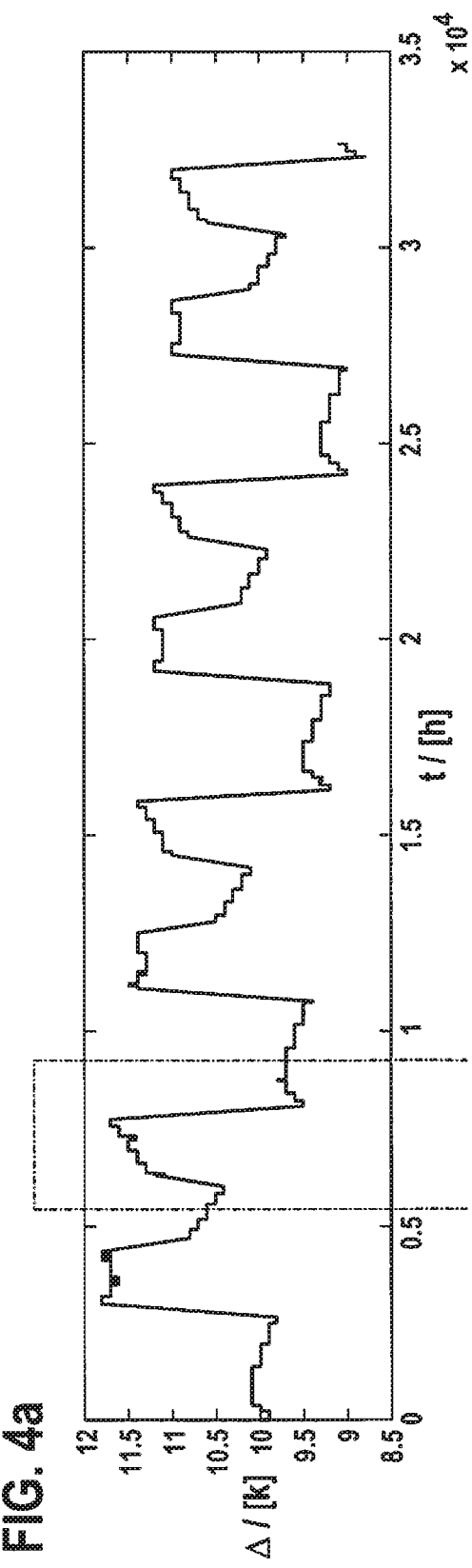
FIG. 4a shows a diagram for the profile of the ascertained difference without a water ingress.
Figure 4B:
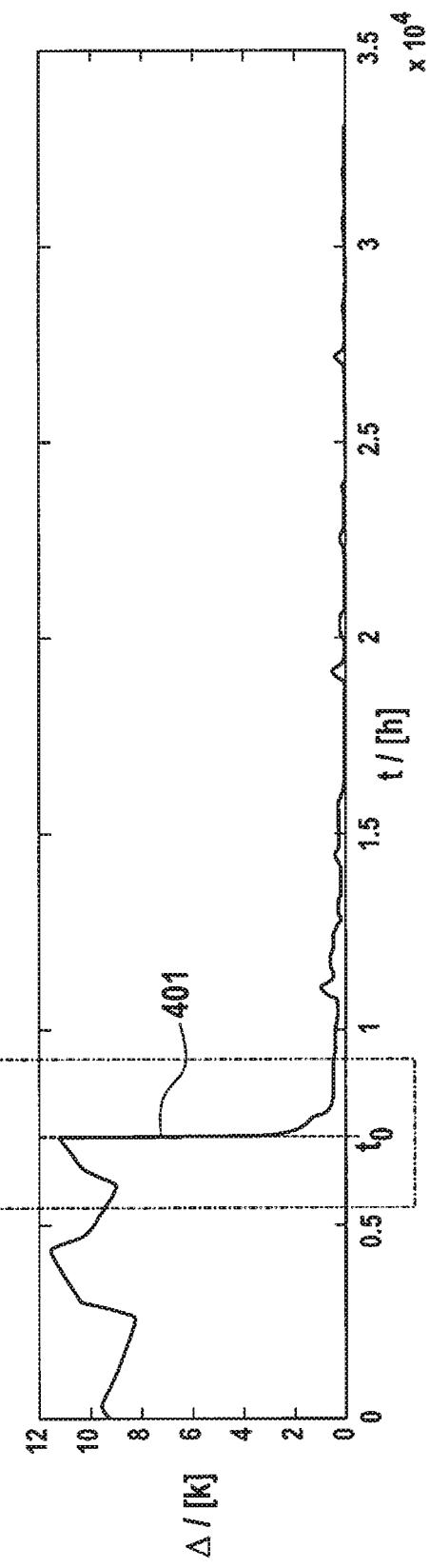
FIG. 4b shows a diagram for the profile of the ascertained difference in the case of a water ingress.

FIGS. 4a and 4b each show a diagram of the chronological profile of difference $\Delta$, ascertained for detection 330 of the water ingress, between instantaneous temperature T detected in step 310 and dew point $\tau$ ascertained as a function of relative air humidity $\angle$ detected in step 320 and as a function of temperature T detected in step 310. Ascertained difference $\Delta$ has unit [K]. The time is indicated in hours or [h]. The profile of ascertained difference $\Delta$ shows natural oscillations or a noise, but no significant deviations, since there is no water ingress. In FIG. 4b, a water ingress 401 into housing 100 takes place at point in time t0 or after approximately 45 minutes, whereby ascertained difference $\Delta$ considerably drops. The water ingress may consequently be reliably detected as a result of this ascertained difference $\Delta$, as soon as ascertained difference $\Delta$ exceeds or falls below a static or dynamic threshold value, for example. Ascertained difference $\Delta$ markedly decreases, for example, even if an ingress of only a small quantity of water takes place into housing 100, since even a small quantity of water always shifts the equilibrium between evaporation and condensation.

FIGS. 5a and 5b each show a diagram of the chronological profile of chronological change rate $\dot{\Delta}$ of difference $\Delta$, ascertained for detection 330 of the water ingress, between instantaneous temperature T detected in step 310 and dew point $\tau$ ascertained as a function of relative air humidity $\angle$ detected in step 320 and as a function of instantaneous temperature T detected in step 310. FIG. 5a corresponds to FIG. 4a (i.e., no water ingress) and FIG. 5b corresponds to FIG. 4b (i.e., with water ingress). Ascertained change rate Δ̇ has unit [K/h]. The time is indicated in hours h. The profile of ascertained change rate Δ̇ shows oscillations or a noise in FIG. 5a, but no significant deviations, since there is no water ingress. In FIG. 5b, a water ingress 501 into housing 100 takes place at point τ n time t0 or after approximately 45 minutes, whereby an amount of ascertained change rate Δ̇ increases. Water ingress 501 may consequently be detected rapidly and reliably with the aid of this ascertained change rate A, for example upon exceedance of a static threshold value or preferably upon exceedance of a dynamic threshold value.

What is claimed is:

1. A method for detecting a water ingress into an interior of a housing, which is sealed against a surroundings, the method comprising the following steps:
    detecting a temperature of air in the interior of the housing;
    detecting a relative air humidity in the interior of the housing;
    detecting a water ingress into the interior of the housing as a function of a chronological change rate of a difference between the detected temperature and a dew point ascertained as a function of the detected relative air humidity and of the detected temperature, wherein based on the detected water ingress, performing at least one of the following:
        automatically establishing a service appointment using a radio contact to a server device and displaying the service appointment; and
        releasing a drying agent by opening a closing device situated in the interior of the housing.

2. The method as recited in claim 1, wherein the detection of the water ingress takes place when the difference and/or the change rate of the difference exceeds a static or dynamic threshold value in each case.

3. The method as recited in claim 1, further comprising the following step:
    displaying information regarding the water ingress as a function of the detection of the water ingress.

4. The method as recited in claim 1, further comprising the following step:
    adapting an electrical charging or discharge current of a current source by switching off of the current flow, which is situated in the interior of the housing, as a function of the detected water ingress.

5. The method as recited in claim 4, wherein the current source is a battery.

6. The method as recited in claim 1, further comprising the following step:
    storing an error code in an electronic memory as a function of the detected water ingress.

7. The method as recited in claim 1, further comprising the following step: changing a service interval of a vehicle as a function of the detected water ingress.

8. An electronic circuit configured to detect a water ingress into an interior of a housing, which is sealed against a surroundings, the electronic circuit configured to:
    detect a temperature of air in the interior of the housing;
    detect a relative air humidity in the interior of the housing;
    detect a water ingress into the interior of the housing as a function of a chronological change rate of a difference between the detected temperature and a dew point ascertained as a function of the detected relative air humidity and of the detected temperature,
    store an error code in an electronic memory as a function of the detected water ingress,
    wherein the electronic circuit is additionally configured to activate an electric motor of an electric bicycle for driving the electric bicycle.

9. A housing which houses an electronic circuit, the electronic circuit configured to detect a water ingress into an interior of a housing, which is sealed against a surroundings, the electronic circuit configured to:
    detect a temperature of air in the interior of the housing;
    detect a relative air humidity in the interior of the housing; and
    detect a water ingress into the interior of the housing as a function of a chronological change rate of a difference between the detected temperature and a dew point ascertained as a function of the detected relative air humidity and of the detected temperature,
    wherein the housing is a housing of a display of a vehicle, or of a battery of the vehicle, or of a drive unit of the vehicle, wherein based on the detected water ingress, performing at least one of the following:
        automatically establishing a service appointment using a radio contact to a server device and displaying the service appointment; and
        releasing a drying agent by opening a closing device situated in the interior of the housing.

10. A vehicle including at least one housing which houses an electronic circuit, the electronic circuit configured to detect a water ingress into an interior of a housing, which is sealed against a surroundings, the electronic circuit configured to:
    detect a temperature of air in the interior of the housing;
    detect a relative air humidity in the interior of the housing; and
    detect a water ingress into the interior of the housing as a function of a chronological change rate of a difference between the detected temperature and a dew point ascertained as a function of the detected relative air humidity and of the detected temperature,
    wherein the housing is a housing of a display of a vehicle, or of a battery of the vehicle, or of a drive unit of the vehicle; and
    wherein the vehicle is an electric bicycle, wherein based on the detected water ingress, performing at least one of the following:
        automatically establishing a service appointment using a radio contact to a server device and displaying the service appointment; and
        releasing a drying agent by opening a closing device situated in the interior of the housing.

* * * * *